Figure 3:
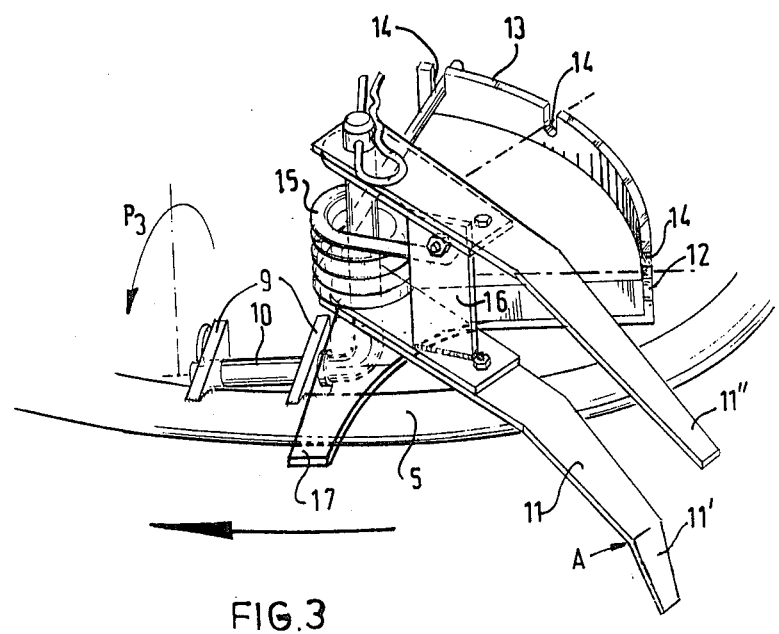

United States Patent [19]

Vissers et al.

[11] 4,329,837

[45] May 18, 1982

[54] AGRICULTURAL IMPLEMENT FOR WORKING CROP LYING ON THE FIELD

[75] Inventors: Hermanus H. Vissers, Nieuw-Vennep; Jan Winkel, Sassenheim, both of Netherlands

[73] Assignee: Expert N.V., Willemstad, Curacao, Netherlands Antilles

[21] Appl. No.: 64,885

[22] Filed: Aug. 8, 1979

[30] Foreign Application Priority Data

Sep. 1, 1978 [NL] Netherlands ............... 7809023

[51] Int. Cl.³ .................................. A01D 79/00
[52] U.S. Cl. .................................. 56/370; 56/377
[58] Field of Search ............... 56/370, 371, 372, 373, 56/374, 377, DIG. 21, 400

[56] References Cited

U.S. PATENT DOCUMENTS

| | | | |
|---|---|---|---|
| 2,656,670 | 10/1953 | Hintz | 56/400 |
| 2,744,377 | 5/1956 | McCall et al. | 56/400 |
| 3,676,988 | 7/1972 | Lienhard | 56/372 |
| 3,910,020 | 10/1975 | Spindler | 56/377 |
| 3,992,863 | 11/1976 | van der Lely | 56/370 |
| 3,995,416 | 12/1976 | van der Lely | 56/370 |
| 4,015,413 | 4/1977 | Van der Rlas | 56/370 |
| 4,218,867 | 8/1980 | Kaetzel | 56/370 |

FOREIGN PATENT DOCUMENTS 2442355 3/1976 Fed. Rep. of Germany ........ 56/400

Primary Examiner—Robert A. Hafer
Attorney, Agent, or Firm—Diller, Ramik & Wight

[57] ABSTRACT

An agricultural implement for raking or spreading crop lying on the field, for example, mown grass, comprising at least one carrier rotatably driven around an upright axis and having upright shaft pins arranged in a circle, on each of which is journalled in a freely pivotable manner a crop-engaging, tine-shaped element of non-circular cross section, wherein a flexible member independently of each element is arranged so that the tine-shaped element is held in an outwardly directed position with respect to the upright axis, said tine-shaped elements preferably consisting of two or more tines in overlying position the bending resistance in the vertical plane of the superjacent tines differs from that of the lower-tine.

14 Claims, 3 Drawing Figures

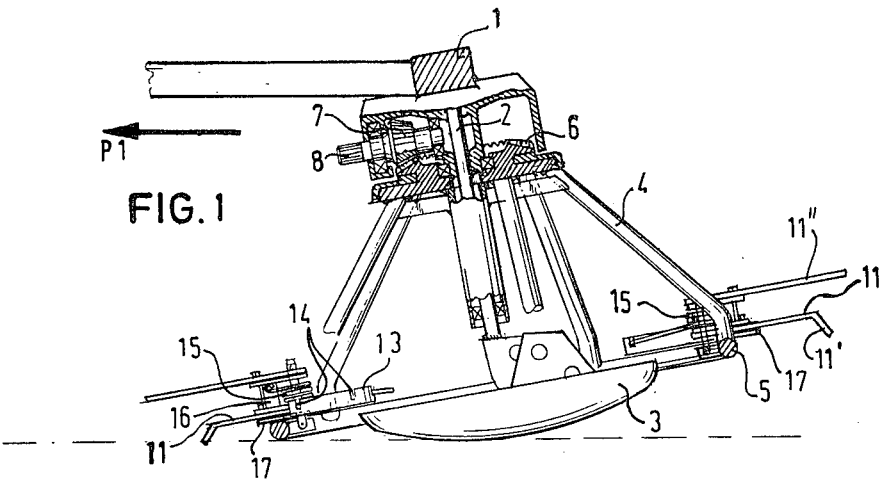
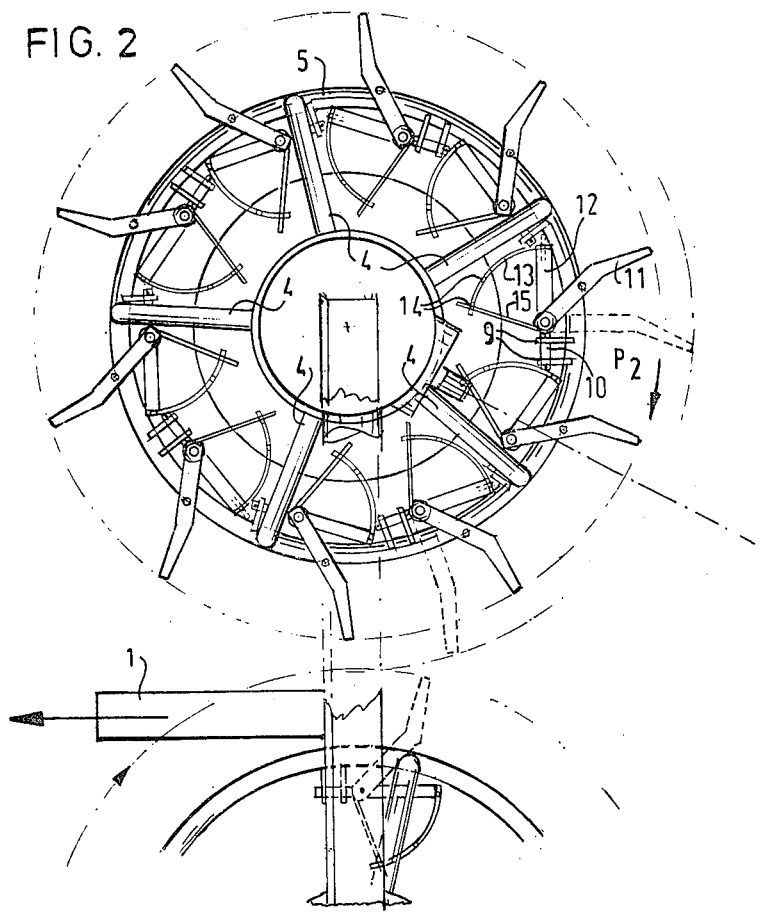

AGRICULTURAL IMPLEMENT FOR WORKING CROP LYING ON THE FIELD

The invention relates to an agricultural implement for working crop lying on the field, for example, mown grass, comprising at least one carrier rotatably driven around an upright axis and having upright shaft pins arranged in a circle, on each of which is journalled in a freely pivotable manner a crop-engaging, tine-shaped element of non-circular cross-section.

In a known embodiment of the type of agricultural implement set forth the tine-shaped elements direct themselves radially outwards under the action of centrifugal force, the elements attaining the desired working position by the adjustment of their stops. It is a drawback that the centrifugal force depends upon the speed of rotation of the elements. This plays a part in the case of sensitive crops requiring a low speed of the elements so that the directive force is weaker and the tines can attain the desired position only with difficulty. The same problem is involved in the beginning of each job, when the elements still have to gain speed.

The invention has for its object to provide a construction in which the tines are held in their working positions in an improved manner.

The agricultural implement according to the invention is distinguished in that a member being flexible independently of each element is arranged so that the tine-shaped element is held in an outwardly directed position with respect to the upright axis.

It is known to use resilient tine elements in this type of agricultural implements, in which, however, the resilient element forms part of the tine-shaped element. According to the invention the functions of the tine-shaped element and of the resilient element are separated from one another so that the dimensions and the materials can be selected to the optimum and the properties of the tines as well as the flexability satisfy the requirements to the optimum.

For example, the flexible member may be made from spring steel, whereas the operative portion of the tine shaped element may have arbitrary shapes (non-circular cross-section or specifically bent tine ends), which can be obtained by other materials than spring steel. The particular advantage of such a tine design is that breakage is minimized so that steel fragments likely to endanger other agricultural machines will not be left in the crop.

According to a further proposal of the invention a free end of the flexible member fastened to the tine-shaped element can be held in a support connected with the shaft pin.

In a preferred embodiment the support has more than one recess for receiving the free end of the flexible member so that the tine-shaped element can be readily set in more than one working position, since such an implement is suitable for raking the crop together or for spreading the crop, such different operations requiring different operative positions of the tine-shaped elements.

According to a further aspect of the invention with tine-shaped elements consisting of two or more tines in overlying position the bending resistance in the vertical plane of the superjacent tines differs from that of the lower tine.

This step has the advantage that stones are not carried along by the group of tines and slung away, but on the contrary they are passed between the tines of the element.

In a preferred embodiment each upper tine is made from a flexible strip of synthetic resin, for example, nylon. Finally the invention proposes to bend the free end of the lower tine in downward direction so that this end can be more readily passed between the stubbles of the plants on the field, which results in an appreciable saving of the power required.

The invention will be described more fully with reference to an embodiment.

The drawing shows in:

FIG. 1 a side elevation of an agricultural implement in accordance with the invention, FIG. 2 a plan view of the implement of FIG. 1, FIG. 3 a perspective view of part of the carrier with a tine-shaped element arranged thereon.

Referring to the figures, the device comprises essentially a frame 1, which is coupled in a manner not shown with an agricultural tractor and is drawn in the direction indicated by the arrow P1 in FIG. 1. The frame 1 comprises two upwardly extending shafts 2 coupled on the lower side with a dish-shaped foot 3, which is dragged across the ground.

About each upwardly extending shaft 2 is rotatably arranged in a carrier 4 consisting mainly of a ring 5 connected by means of tubular spokes with the upper rim 6 of the carrier. The upper rim 6 has conical toothing co-operating with a bevel pinion 7 fastened to a key-way shaft 8 driven by the power take-off shaft of the agricultural tractor.

At equal intervals the inner side of the ring 5 has welded to it pairs of ears 9 (see FIGS. 2 and 3) having registered holes. Through these holes is passed one limb of an L-shaped rod 10 so that rotation of the rod 10 in the holes remains possible.

The other limb of the L-shaped rod 10, which forms an upwardly extending stub shaft, is provided with a freely pivotable tine-shaped element 11 so that the tine-shaped element 1 is freely pivotable on the carrier 4. Owing to the pivotal structure formed by the ears 9 the tine-shaped element 11 can also move up and down in a vertical plane with respect to the carrier 4.

The standing limb of the rod 10 has secured to it a support 12 which changes at the end remote from the stub shaft into an arcurate plate 13 having more than one recess 14.

A helical spring element 15 forming a flexible member is fastened on one side to a plate 16 of the tine-shaped element 11 forming a spacer element, whereas the other free end of the flexible member 15 fits in the recess 14 of the plate 13. For the sake of completeness it should be noted that in this embodiment the turns of the helical spring surround the upright limb of the curved rod 10.

The tine shaped element 11 comprises a lower tine 11' and a tine 11" positioned at a given distance above the former, said distance corresponding to the length of the plate 16.

The lower tine is bent in the vertical plane at A so that the end is at a larger angle to the ground. Moreover, the lower and/or upper tine is bent in the plane at right angles to the shaft 2 so that the tine ends are in a less trailing position with respect to the direction of rotation indicated by the arrow P2 in FIG. 2.

The lower tine 11' as well as the upper tine 11" are both made from strip-shaped material, the lower tine being preferably punched from steel sheet, whereas the upper tine 11" is made from a synthetic resin. In this way the required difference in bending resistances in the vertical plane are obtained.

The device operates as follows.

By driving the auxiliary shaft 8 by means of the power take-off shaft of the agricultural tractor the carrier 4 is rotated via the bevel pinion mechanism 6,7 in the direction of the arrow P2 (see FIG. 2).

The operator has previously put the free end of the flexible element 15 in one of the recesses 14 of the arcuate bracket support 13 in order to adapt the device to the desired raking or tedding position. During the rotation the tine-shaped elements 11 will swing outwardly owing to the centrifugal force in the direction of the arrow P3 in FIG. 3 by means of the pivotal structure with the ears. A tag 17 of the support 12 then comes into contact with the ring 5. Then the tine-shaped elements 11 are in the desired working position. In the event of a heavy resistance due to an impact on a stone the lower tine 11 can deflect to the rear thanks to the pivotal structure about the upright limb of the L-shaped rod 10. The tine shaped element is rapidly turned back by the effect of the flexible element 15. In the event of a large stone having to pass between the lower and upper tines of the element 11 the upper tine 11" of this embodiment can readily deflect upwards owing to the low bending resistance in the vertical plane.

Thanks to the downwardly bent-over end of the lower tine 11' only low power is required for passing the tine across the standing stubbles of the plants on the field.

The invention is not limited to the embodiment described above; it may be imagined to use a leaf spring fastened to the plate 16 and fitting in recesses of the arcuate supporting plate 13. Moreover, rubber or nylon sleeves may be used as flexible members between the hub of the element and the stub shaft. In this way not only in the plane at right angles to the upright shaft of the tine-shaped element but also in the vertical plane a resilient structure is obtained.

The possibilities of adjustment illustrated in FIG. 3 may also be embodied in any suitable way. The plate 13 with the recesses may be fastened to the free end of the flexible member 15, the plate 13 being moved with the flexible member and brought into contact with a matching supporting plate 12 fitting in the recesses of the plate 13.

As an alternative the upper tines 11" may be constructed so as to be rigid in the vertical plane, whereas the lower tine is movable in this vertical plane.

What is claimed is:

1. An agricultural implement for raking a crop such as hay, comprising the combination of:
   a frame, a carrier rotatably mounted on said frame about a generally upright axis and means for rotatably driving said carrier about said axis;
   a plurality of tine assemblies mounted on said carrier in a circular pattern concentric with said axis whereby each tine assembly is subjected to centrifugal force as the carrier is rotated, each tine assembly including at least one tine element and pivot means freely pivoting such tine element about an upright axis to swing outwardly of the carrier to operative position in response to said centrifugal force, and spring means separate from each tine but engaging same to oppose inward deflection of such tine.

2. An agricultural implement as defined in claim 1 wherein each tine is of non-circular cross section so as to be stiffer in the plane of rotation of the carrier than it is in the direction perpendicular thereto.

3. An agricultural implement as defined in claim 1 or 2 wherein each tine is of flat, blade-like form.

4. An agricultural implement as defined in claim 1 or 2 wherein said pivot means is in the form of a stub shaft freely pivotally receiving one end of its associated tine.

5. An agricultural implement as defined in claim 1 or 2 wherein each tine assembly includes a second tine disposed in spaced, overlying relation to the first mentioned tine and freely pivotal in unison therewith.

6. An agricultural implement as defined in claim 5 wherein one of said first and second tines is more flexible perpendicular to the plane of carrier rotation than is the other.

7. An agricultural implement as defined in claim 6 wherein each tine is of flat, blade-like form.

8. An agricultural implement as defined in claim 1 or 2 wherein said pivot means comprises a stub shaft and means mounting the stub shaft for swinging movement about an axis generally tangential to the rotation of said carrier.

9. An agricultural implement as defined in claim 1 or 2 wherein each tine assembly includes a support fixed to said pivot means and wherein said spring means acts between said support and said tine.

10. An agricultural implement as defined in claim 9 wherein each support is provided with a plurality of recesses for adjustably receiving the associated spring means.

11. An agricultural implement as defined in claim 9 wherein each spring means comprises a helical spring surrounding the associated stub shaft.

12. An agricultural implement as defined in claim 9 wherein said pivot means comprises a stub shaft and means mounting the stub shaft for swinging movement about an axis generally tangential to the rotation of said carrier.

13. An agricultural implement as defined in claim 12 wherein said carrier includes a ring and said support includes a leg overlying and engaging said ring to maintain said tine substantially in the plane of carrier rotation.

14. An agricultural implement as defined in claim 5 wherein one of said tines of each tine assembly is formed of a synthetic resin.

* * * * *